United States Patent
Chapman et al.

[11] 4,008,950
[45] Feb. 22, 1977

[54] ELECTROCHROMIC DISPLAY CELL STRUCTURE

[75] Inventors: Richard A. Chapman; Raymond J. Jasinski; William G. Manns, all of Dallas, Tex.

[73] Assignee: Texas Instruments Incorporated, Dallas, Tex.

[22] Filed: July 7, 1975

[21] Appl. No.: 593,409

[52] U.S. Cl. .............................. 350/160 R; 340/336
[51] Int. Cl.² ............................................ G02S 5/23
[58] Field of Search ............. 350/160, 311, 312; 340/336

[56] References Cited
UNITED STATES PATENTS

| | | | |
|---|---|---|---|
| 3,708,220 | 1/1973 | Meyers et al. | 350/160 R |
| 3,712,710 | 1/1973 | Castellion et al. | 350/160 R |
| 3,771,855 | 11/1973 | Burns | 340/336 |
| 3,786,499 | 1/1974 | Jankowski et al. | 340/336 |
| 3,824,582 | 7/1974 | Glaser et al. | 340/336 |
| 3,827,784 | 8/1974 | Giglia et al. | 350/160 P |

*Primary Examiner*—David C. Nelms
*Attorney, Agent, or Firm*—Harold Levine; James T. Comfort; William E. Hiller

[57] ABSTRACT

An electrochromic display cell having a transparent front panel with an internal conductive coating providing a pleasing external appearance, and masking a counter-electrode affixed thereto; said internal coating having a window area to permit external viewing of display electrodes affixed to the back panel, which is sealed to the front panel with a ring spacer to provide an electrolyte chamber about five to ten mils thick; external electrode contacts to the electrical leads to the display electrodes are arranged on the back or front panel.

12 Claims, 3 Drawing Figures

ELECTROCHROMIC DISPLAY CELL STRUCTURE

This invention relates to an image display cell, and more particularly to the structure of an image display cell of the electrochromic type suitable for displaying periodically changing information such as numbers or letters to a viewer.

Electrochromic devices have been disclosed in the prior art for uses such as light filters, modulators and pattern and information display devices. Basically such devices comprise at least a pair of electrodes contacted by an electrically insulating, ion-permeable, usually fluid, material. Upon application of an electrical potential between the electrodes, an action similar to electroplating takes place which results in one of the electrodes, the display electrode, changing color. In most cells of this type the color change remains even after the electrical potential is removed. For most purposes, the electrochemical reaction producing the color change is reversible so that the original color can be restored to the display electrode. Also in most instances, the original color restoration is achieved by reversing the electronic current flow between the external electrode contacts, although in some devices the removal is achieved by merely removing the electrical potential or by electrically shorting the electrodes together.

In such electrochromic devices, the display electrode may be a transparent electrode which can be electrochemically changed to be opaque to a broad or narrow band of the visible light spectrum, i.e. the transparent electrode will change to black or to some color. Also, the display electrode may initially be of a characteristic color and be changed to a contrasting color by the electrochemical reaction.

In the operation of a common type of electrochromic device, the applied potential causes the display electrode, which may be patterned for information display purposes, to receive ions from the contacting electrolyte which is usually liquid but may be solid, and there is produced on the electrode an adherent insoluble colored film. The second or counter-electrode, supplies to the electrolyte ions of the polarity type depleted from the electrolyte to produce the film on the display electrode. Upon reversal of the current in the system, the chemical reaction is reversed and the display electrode returns to its original state.

Examples of suitable materials for use in operable combinations of display electrodes, counter-electrodes and electrolytes in electrochromic devices and more detailed explanations of their operation, are disclosed in U.S. Pat. No. 3,451,741, No. 3,829,196, No. 3,854,794 and others.

Although electrochromic devices have been well known for some time, interest in their use for information displays in certain applications such as electronic watches, has increased with the discovery of material combinations providing fast low-power operation over a considerably extended operation-cycle life. In such applications, the aesthetic appearance and physical size of the cell are quite important. For example it is desirable that the face of the cell present a jewelry-like appearance such as finished gold or silver.

Prior art display cells have not fully solved the problems of providing a cell in which the leads to the display electrodes and the counter-electrodes are hidden from the observer's view while still providing a sharp, even, and attractive display of high contrast at reasonable cost.

According to the present invention, an electrochromic display cell suitable for many applications, including watches, comprises an insulative back panel on which the display electrode segments, electrical leads, and electrical contacts are fixed and a transparent front panel on which the counter-electrode lead and the counter-electrode are fixed. The counter-electrode lead is of a material that presents a pleasing jewelry-like appearance through the transparent front panel. An opening is left in the front panel coating to allow viewing of the display electrodes, which in their "off" condition blend with the front panel coating. Such a structure overcomes problems associated with prior art cells in which both the display electrodes and the counter-electrodes are plated on to the back panel. In these prior art cells, it is necessary to provide two metallic layers separated by an insulating material of sufficient thickness to prevent shorting of the display electrode leads to the counter-electrode. Further, in prior art cells with the counter-electrode very nearly coplanar with the display electrode, the electrolyte cavity must be greater than a certain minimum depth, usually on the order of 25 mils or greater to assure an even color coating on the display electrode when the cell is operated. Thus, the completed cell cannot be made as thin as is often desired. Further, the process of providing that two metallic layers be separated by insulation has proved more costly than desirable.

Therefore it is an object of the present invention to provide an electrochromic information display cell having a lower manufacturing cost than comparable prior art cells.

It is a further object of the present invention to provide an electrochromic information display cell which can be made thinner and which presents a more pleasing appearance than prior art cells.

It is a still further object of the present invention to provide an electrochromic display cell suitable for use in applications such as electronic watches.

These and other objects and advantages of the present invention will become more apparent from the following detailed description when read in conjunction with the accompanying drawing in which.

Figure 1:
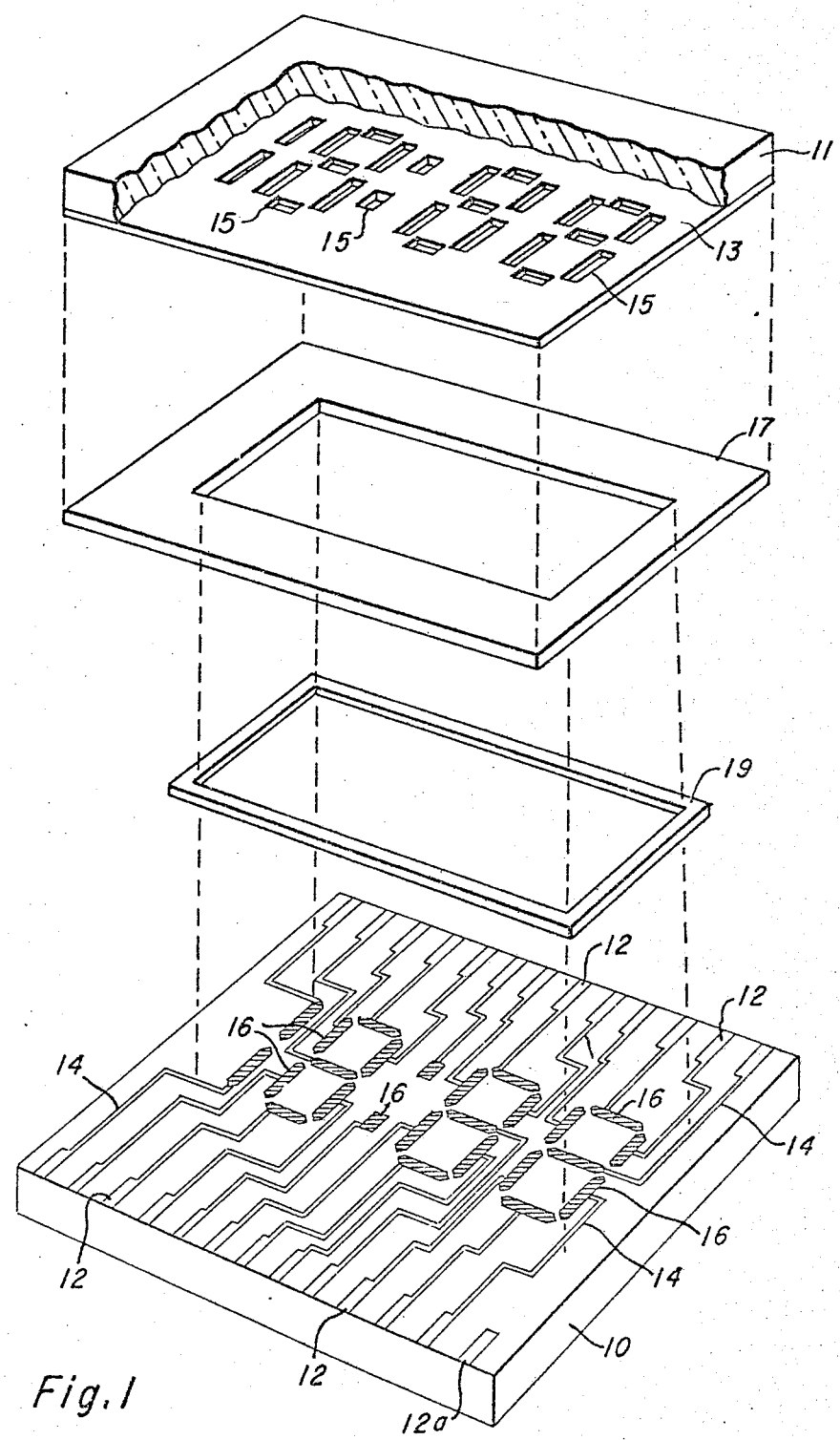
FIG. 1 is an exploded view of the electrochromic display cell of the present invention.

Referring now to FIG. 1, a preferred embodiment of the electrochromic display cell of the present invention comprises a flat insulative back panel 10 of ceramic, plastic, glass or other suitable material to which are applied the external lead contacts 12, internal conductive leads 14 and digit segment display electrodes 16. The contacts 12, leads 14, and display electrodes 16 may be of any of the any well known materials suitable for these purposes. In the presently described embodiment of the invention which is suitable for electronic watch applications, all of these elements 12, 14, and 16 are of gold, silver, or platinum, depending on the color desired, and may be applied by any suitable vapor deposition or plating technique. Other techniques of application may be used. Overlying the internal leads 14 is a thin electrically insulating and ion-impermeable coating to prevent these leads receiving the color change coating which will appear on the selected display electrodes during operation of the cell. This insulating coating may be of a material such as silicon oxide or nitride.

Figure 2:
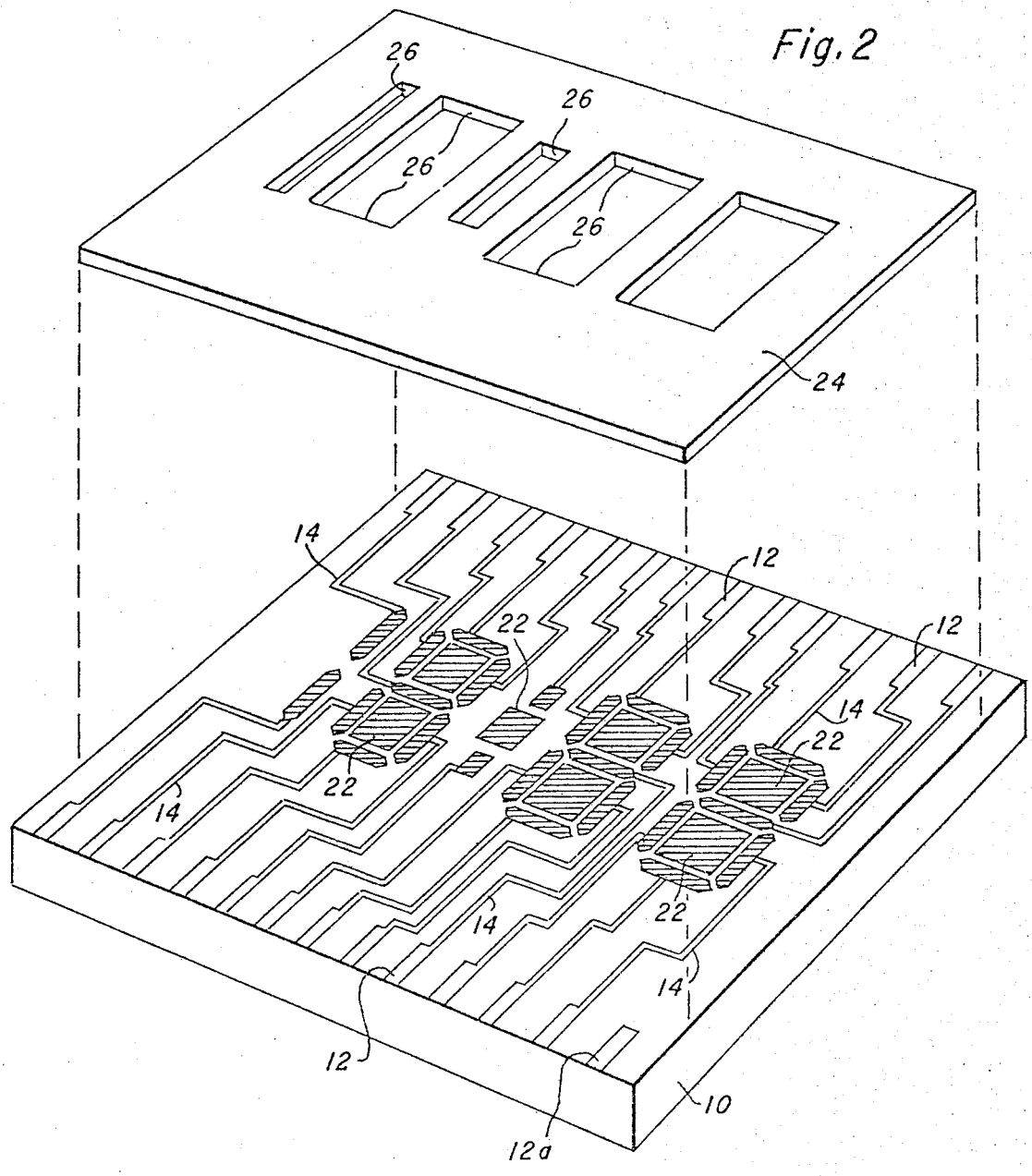
FIG. 2 illustrates an alternative configuration for the front and back panel coatings which can be used in the electrochromic display cell of the present invention.

In the embodiments of the invention in which the front panel coating hides the electrode leads, such as the embodiments of FIGS. 1 and 2, the insulating coating over the electrode leads is optional. However, its use reduces the power required to operate the cell. In embodiments such as that of FIG. 3, its use prevents the electrode leads from changing color along with the digit display segments which would, of course, be visible through the viewing aperture and therefore undesirable.

The front panel 11 is of transparent material such as glass or known suitable plastics. A metallic layer 13 such as gold or chromium is applied to the underside of front panel 11 as by plating to provide a "background field" to the viewer of the cell. It has been found that by using a "flash" of chromium prior to gold plating, the gold can be made more adherent to the front panel while still retaining the gold color. Openings 15 are left or created in the metallic layer to provide viewing apertures for the display electrodes. These apertures mask the electrode leads from the viewer.

Applied to the under or internal surface of the front panel metallic coating is a counter-electrode ring 17 which may also be applied by plating or other techniques. A suitable material for the system used here for illustration purposes is palladium. The counter-electrode ring may extend from close to the outer edge of the front panel to near the aperture opening and even between the openings to frame the apertures.

Separating the front panel from the back panel is a spacer ring 19 which may be between 5 and 10 mils thick and of glass, plastic, or other material inert to the electrolyte such as polytetrafluoroethylene (Teflon). The front and back panels and the spacer form a cavity to hold the electrolyte of the cell. The spacer ring is of slightly smaller outside dimensions than the front panel, which in turn is smaller in width than the back panel so that in the assembled cell the contacts 12 remain externally exposed to provide a means for electrical connection to the internal elements of the cell. The cell is sealed by a sealant such as an epoxy resin glue in the peripheral space between the front and back panels outside the spacer 19. Electrical contacts to the counter-electrode 17 are provided on a surface outside of the spacer 19. If desired, such a connection can be provided through a contact, such as contact 12a, on the back panel by means of a small region of electrically conductive epoxy or the like, which connects the contact to the front panel layers.

It is realized of course that, if desirable, all external electrical connections to the cell can be provided on the back of the front panel. In such a structure, the front panel is made larger in one major dimension than the back and isolated metalized contact regions, corresponding to the contact regions on the back panel, are provided on the "overhang" region of the front panel. Each of the front contact regions is then electrically connected to its corresponding contact region on the back panel by means of electrically conductive a drop of epoxy glue or the like.

Although not shown, it is to be understood that the front or back panels may be provided with fill holes and caps or plugs for introducing an electrolyte fluid into the cell after assembly. Other methods of filling the cell with electrolyte may, of course, be used. For use with the gold or chromium and palladium electrode system illustrated, any of the electrolytes of the prior art suitable with such an electrode combination may be used. Certain aqueous solutions of N-heptylviologen salts are examples.

To some, the "shadow" effect produced around each display segment in a cell like that illustrated in FIG. 1 wherein the display electrodes are viewed through the small segment shaped openings in the front layers is aesthetically objectionable. This is true even with the very thin (5 mil) spacing between the front and back panels allowed by the structure of the present invention as compared to prior art cells often requiring 25 mils or more spacing for proper operation. The coating pattern shown in FIG. 2 eliminates the "shadow" effect around each segment but the effect still appears around each digit. In the display electrode coating pattern of the back panel, there are added other plating regions 22 which are not connected to any potential source and thus do not enter into the electrochemical reaction of the cell. They do, however, serve as a coplanar contrasting background for the energized electrodes. The front panel coating pattern 24 contains openings 26 which form the outline for the complete digits rather than for the individual digit segments as in the coating pattern of FIG. 1.

Figure 3:
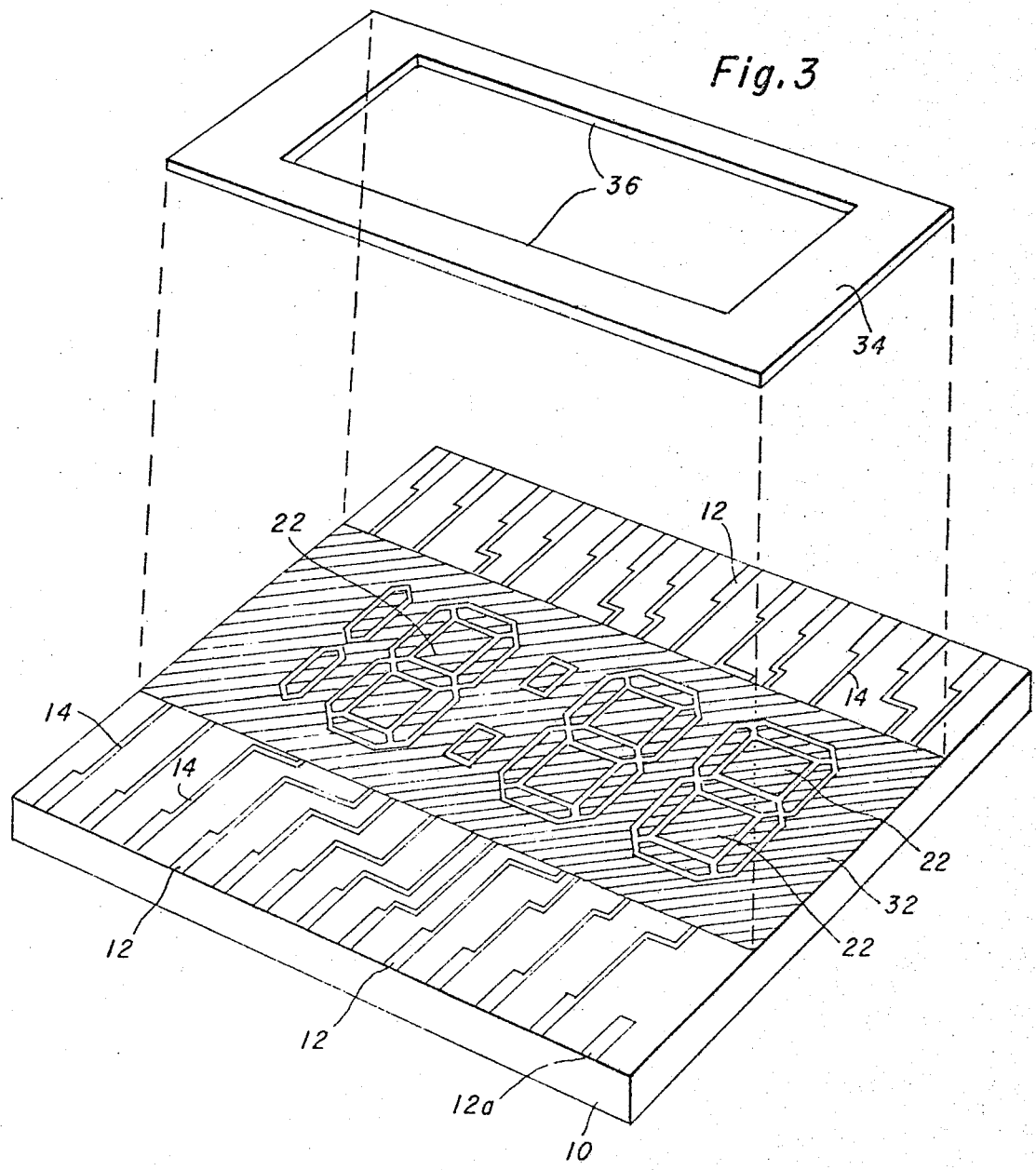
FIG. 3 illustrates an additional alternative configuration for the front and back panel coatings which can be used in the electrochromic display cell of the present invention.

The "shadow" effect on the display digit segment electrodes may be more completely eliminated by the coating patterns shown in FIG. 3. Here the back panel coating pattern has added an unconnected and thus neutral surrounding background pattern 32. The front panel coating pattern 34 has a single window opening 36 through which the entire numeric display is viewed. Thus in the arrangement of FIG. 3, the display electrodes and the contrasting background all appear in a single plane. As mentioned previously, however, an insulating coating of silicon oxide or nitride should be used over the electrode leads in this embodiment.

Thus, there has been disclosed an electrochromic display cell structure offering the advantages previously enumerated. Modifications and changes still within the spirit of the present invention will occur to those skilled in the art. The illustrated embodiments are not to be considered in any way to limit the scope of the present invention, which is to be limited only as defined in the following claims.

What is claimed is:

1. An electrochromic information display cell comprising:
   a. a transparent front panel having affixed to its internal surface an opaque metallic coating visible from its external surface to provide a background field for the display cell, said metallic coating having at least one opening therein permitting viewer observation of internal portions of said cell, and a counter-electrode layer affixed to said metallic coating;
   b. a back panel having affixed to the internal surface thereof at least one display electrode positioned to be viewed through said at least one opening in said metallic coating affixed to said front panel; an electrical contact region corresponding to each of said at least one display electrode and positioned near an edge of said back panel; and an electrically conductive lead coating connecting each electrical contact region with its corresponding display electrode;

c. a spacer ring member sealed between said front panel and said back panel, and defining an electrolyte chamber which includes said at least one display electrode and at least a portion of said counter-electrode layer; and d. an electrolyte within said electrolyte chamber.

2. An electrochromic information display cell as defined in claim 1, wherein said metallic coating has a plurality of openings, each positioned over and corresponding in shape to an individual display electrode.

3. An electrochromic information display cell as defined in claim 1, wherein said metallic coating has a plurality of openings, each positioned over and outlining a group of display electrodes which constitutes a multi-segment digit of said display and wherein substantially all regions of said back panel viewable through said openings, other than said display electrodes, have affixed thereto coatings of the same material as said display electrodes, but electrically insulated from all other layers and coatings of said cell to serve as a coplanar contrasting background for said display electrodes upon selective energization thereof.

4. An electrochromic information display cell as defined in claim 1, wherein a group of display electrodes constituting the full display of said cell is affixed to the internal surface of said back panel, said metallic coating having a single opening positioned over and outlining said group of display electrodes and substantially all of the regions of said back panel viewable through said opening other than said display electrodes having affixed thereto coatings of the same material as said display electrodes but electrically insulated from all other layers and coatings of said cell to serve as a coplanar contrasting background for said display electrodes upon selective energization thereof.

5. An electrochromic information display cell as defined in claim 1, further including means providing an electrically conductive path between said counter-electrode layer and one of said electrical contact regions on said back panel.

6. An electrochromic information display cell as defined in claim 2, further including means providing an electrically conductive path between said counter-electrode layer and one of said electrical contact regions on said back panel.

7. An electrochromic information display cell as defined in claim 3, further including means providing an electrically conductive path between said counter-electrode layer and one of said electrical contact regions on said back panel.

8. An electrochromic information display cell as defined in claim 4, further including means providing an electrically conductive path between said counter-electrode layer and one of said electrical contact regions on said back panel.

9. An electrochromic information display cell as defined in claim 1, wherein said spacer ring member is between about 5 and 10 mils thick.

10. An electrochromic information display cell as defined in claim 4, wherein said spacer ring member is between about 5 and 10 mils thick.

11. An electrochromic information display cell as defined in claim 1, wherein said back panel is different in at least one major dimension from said front panel so as to present said electrical contact region corresponding to each of said at least one display electrode outwardly with respect to the peripheral edge of said front panel.

12. An electrochromic information display cell as defined in claim 1, wherein the thickness of said spacer ring number in a direction extending between said front panel and said back panel is sufficiently thin such that said electrolyte chamber defined thereby in conjunction with said front panel and said back panel has a depth of less than 25 mils.

* * * * *